(12) United States Patent
Wuidart et al.

(10) Patent No.: US 6,476,709 B1
(45) Date of Patent: Nov. 5, 2002

(54) TRANSMISSION OF DIGITAL DATA OVER AN A.C. SUPPLY LINE

(75) Inventors: Luc Wuidart, Pourrieres; Michel Bardouillet, Rousset, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/336,894

(22) Filed: Jun. 21, 1999

(30) Foreign Application Priority Data

Jun. 22, 1998 (FR) .............................................. 98 08024

(51) Int. Cl.⁷ .............................................. H04M 11/04
(52) U.S. Cl. .................................................. 340/310.01
(58) Field of Search ....................... 340/310.02, 310.01, 340/310.04, 825.22, 825.23

(56) References Cited

U.S. PATENT DOCUMENTS

| | | |
|---|---|---|
| 3,618,089 A | 11/1971 | Moran, Jr. et al. |
| 4,068,232 A | 1/1978 | Meyers et al. |
| 4,278,977 A | 7/1981 | Nossen |
| 4,408,185 A | 10/1983 | Rasmussen |
| 4,656,472 A | 4/1987 | Walton |
| 4,782,308 A | 11/1988 | Trobec et al. |
| 4,802,080 A | 1/1989 | Bossi et al. |
| 4,814,595 A | 3/1989 | Gilboa |
| 4,963,887 A | 10/1990 | Kawashima et al. |
| 5,013,898 A | 5/1991 | Glasspool |
| 5,126,749 A | 6/1992 | Kaltner |
| 5,142,292 A | 8/1992 | Chang |
| 5,305,008 A | 4/1994 | Turner et al. |
| 5,452,344 A | * 9/1995 | Larson ........................ 379/107 |
| 5,493,267 A | 2/1996 | Ahlse et al. ................. 340/310 |
| 5,504,484 A | 4/1996 | Landt et al. |
| 5,521,602 A | 5/1996 | Carroll et al. |
| 5,541,604 A | 7/1996 | Meier |
| 5,550,536 A | 8/1996 | Flaxl |
| 5,604,411 A | 2/1997 | Venkitasubrahmanian et al. |
| 5,621,411 A | 4/1997 | Hagl et al. |
| 5,691,605 A | 11/1997 | Xia et al. |
| 5,703,573 A | 12/1997 | Fujimoto et al. |
| 5,767,503 A | 6/1998 | Gloton |
| 5,801,372 A | 9/1998 | Yamaguchi |
| 5,831,257 A | 11/1998 | Yamaguchi |
| 5,874,725 A | 2/1999 | Yamaguchi |
| 6,025,780 A | 2/2000 | Bowers et al. |
| 6,028,503 A | 2/2000 | Preishuberpflugl et al. |
| 6,072,383 A | 6/2000 | Gallagher, III et al. |
| 6,137,411 A | 10/2000 | Tyren |
| 6,208,235 B1 | 3/2001 | Trontelj |
| 6,229,443 B1 | 5/2001 | Roesner |
| 6,243,013 B1 | 6/2001 | Duan et al. |
| 6,265,962 B1 | 7/2001 | Black et al. |

FOREIGN PATENT DOCUMENTS

| | | | |
|---|---|---|---|
| DE | A-28 35 549 | 3/1979 | ............ H02J/13/00 |
| DE | 44 44 984 | 12/1994 | |
| DE | 195 46 928 | 6/1997 | |
| DE | 196 21 076 | 11/1997 | |

(List continued on next page.)

OTHER PUBLICATIONS

French Search Report from French Patent Application 98 08024, filed Jun. 22, 1998.
French Search Report from French Patent Application No. 99 09563, filed Jul. 31, 1999.

(List continued on next page.)

*Primary Examiner*—Daryl Pope
(74) *Attorney, Agent, or Firm*—Wolf, Greenfield & Sacks, P.C.; James H. Morris (57) ABSTRACT

The present invention relates to a method of data transmission over an A.C. power supply line of a load to be cyclically powered, including organizing a switching of the A.C. supply voltage according to a coding of the data to be transmitted and outside cyclic load supply periods.

23 Claims, 4 Drawing Sheets

FOREIGN PATENT DOCUMENTS

| | | | |
|---|---|---|---|
| DE | A-196 32 282 | 2/1998 | ............ H05B/41/39 |
| EP | A-0 038 877 | 11/1981 | ............ H02J/13/00 |
| EP | 0 369 622 | 5/1990 | |
| EP | 0 568 067 A | 11/1993 | |
| EP | 0 579 332 A1 | 1/1994 | |
| EP | 0 645 840 A | 3/1995 | |
| EP | 0 768 540 | 4/1997 | |
| EP | 0 857 981 A1 | 8/1998 | |
| EP | 0 902 475 A | 3/1999 | |
| FR | 2 114 026 | 6/1972 | |
| FR | 2 746 200 | 9/1997 | |
| FR | 2 757 952 | 7/1998 | |
| GB | A-2 298 553 | 9/1996 | ............ H02J/13/00 |
| GB | 2 321 726 A1 | 8/1998 | |
| WO | WO 93/17482 | 9/1993 | |
| WO | WO 98/20363 | 5/1998 | |
| WO | WO 99/33017 | 7/1999 | |
| WO | WO 99/43096 | 8/1999 | |

OTHER PUBLICATIONS

French Search Report from French Patent Application No. 98 08025, filed Jun. 22, 1998.

French Search Report from French Patent Application No. 99 04547, filed Apr. 7, 1999.

French Search Report from French Patent Application No. 99 04546, filed Apr. 7, 1999.

French Search Report from French Patent Application No. 99 04548, filed Apr. 7, 1999.

French Search Report from French Patent Application No. 99 04544, filed Apr. 7, 1999.

French Search Report from French Patent Application No. 00/01214, filed Jan. 31, 2000.

French Search Report from French Patent Application No. 99 09564, filed Jul. 20, 1999.

French Search Report from French Patent Application No. 00/06301, filed May 17, 2000.

French Search Report from French Patent Application No. 99 04545, filed Apr. 7, 1999.

French Search Report from French Patent Application No. 99 07024, filed May 31, 1999.

French Search Report from French Patent Application No. 00 06320, filed May 17, 2000.

French Search Report from French Patent Application No. 00 06065, filed May 12, 2000.

French Search Report from French Patent Application No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

French Search Report from French Patent Application No. 99 04548, filed Apr. 7, 1990.

* cited by examiner

TRANSMISSION OF DIGITAL DATA OVER AN A.C. SUPPLY LINE

BACKGROUND OF THE INVENTION

1. Field of the Invention

The present invention relates to the transmission of digital data over a low frequency A.C. supply line, for example, the 50-Hz or 60-Hz mains voltage.

The present invention more specifically applies to the transmission of digital data between a transmitter placed on an A.C. supply line dedicated to a load and this load. This line can be, for example, the supply line between a switch and a lamp (for example, a ceiling lamp), between a switch and a controlled tap, between a control station and one or several electric devices that it controls by powering them and, more generally, between any device of remote control and a load to which the control device is connected by an A.C. low frequency supply line.

2. Discussion of the Related Art

Figure 1:
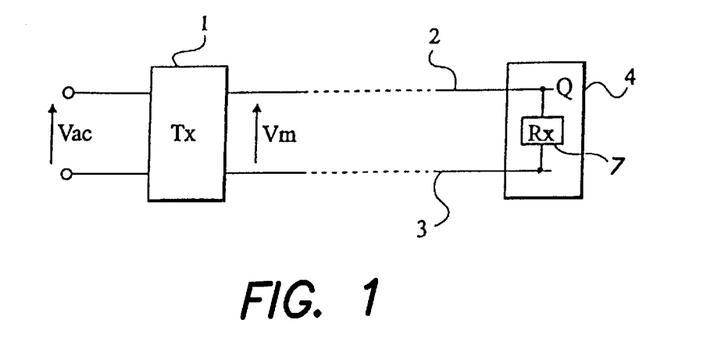
FIGS. 1 and 2, previously described, are meant to show the state of the art and the problem to solve.
Figure 2:
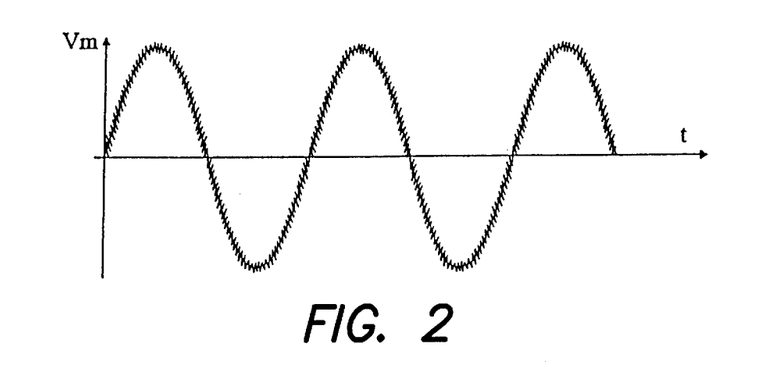

FIGS. 1 and 2 illustrate a technique conventionally used when a digital information is desired to be transmitted over a low frequency A.C. supply line. This technique consists of using the so-called carrier current principles, that is, using the A.C. supply voltage as a transmission support for a low voltage signal superposed to the A.C. voltage.

Implementing such a solution requires (FIG. 1) a system 1 of modulation (Tx) adapted to modulating A.C. supply voltage Vac (for example, the mains voltage) to provide an A.C. voltage Vm (FIG. 2) over the supply line (phase 2, neutral 3) of a load (Q). On the side of load 4, a demodulation system 5 adapted to extracting the modulating signal from the carrier current has to be available.

The transmission of digital information on a carrier current has to deal with significant constraints which result in the use of particularly complex transmission/reception systems to succeed in properly exploiting the digital data.

First, the system depends on the impedance of the supply main. Due to the low impedance of electric lines, signals transmitted in modulation have to exhibit the lowest possible energy level and are thus difficult to recover on the receive side.

Further, the recovery of the data signals requires a selective filtering to separate the data from the low frequency A.C. voltage and from its disturbances.

In some applications, the constraints linked with carrier current data transmission cause the return to a still prior solution which consists of using an additional link dedicated to the data transmission. Such an additional link has the obvious disadvantage of multiplying the number of live wires between the transmitter and the receiver, and of being impossible to use in an existing installation where a single twin-wire A.C. supply line connects the transmitter to the load.

To avoid such an additional link, European Patent Application 0,038,877 provides for isolating the supply line from the load so that the conductors of the line can be used to transmit a signal other than the supply signal. A drawback of this approach is that the power supply is interrupted during the whole duration of the information transmission. Additionally, it is necessary not only to isolate the power supply line but also to connect to this line, during the transmission periods, an emitter generating the information signal and its carrier.

Another approach consists in interrupting the load supply line in according with the binary coding of an information to be transmitted, each period of the A.C. power supply containing at most one bit. For example, the International Patent Application 93/18568 provides for interrupting the line during the half of a positive halfwave to transmit a "1", a "0" being represented by a non modified period of the A.C. supply. The transmission rate corresponds to the frequency of the A.C. supply. A similar solution is disclosed in the United Kingdom Patent Application 2,298,553 that provides for interrupting the supply of a lamp at each positive halfwave (at most once per halfwave) of the A.C. supply voltage. A drawback of these solutions, in addition to a very low rate, is that they impair the supply of the load which no longer receives a supply during the periods during which it needs energy.

SUMMARY OF THE INVENTION

The present invention aims at providing a novel solution to transmit digital data over an A.C. supply line.

The present invention especially aims at providing a transmission of digital data which can be performed by means of transmitters and receivers of particularly simple structure while maintaining the load supply.

The present invention also aims at overcoming the disadvantages of conventional methods of transmission by carrier current modulation.

The present invention also aims at providing a solution in which the transmission rate is not linked with the load supply frequency, and that permits higher rates than the rates of the know solutions that interrupt the lines in accordance with the data flow to be transmitted.

A feature of the present invention is to dissociate in time, in the A.C. signal, periods when the A.C. voltage has to supply the load and periods where this A.C. supply is not exploited by the load and can thus be used to carry digital data.

Thus, conversely to conventional methods, which consist of superposing the power signal and the data signal, the present invention provides to have the load supply periods and the data transmission periods follow one another in time.

Another feature of the present invention is to use the A.C. supply voltage as an envelope signal for the digital data during periods where said data are present.

Thus, the present invention provides to periodically transfer the power required to supply the load and to use the periods which are not used by this load supply to transmit the digital data by switching the A.C. voltage at a frequency greater than the frequency of the A.C. voltage.

Generally, the present invention is based on an observation made by the inventors according to which, when data are desired to be transmitted to a load by the carrier current technique, this load very often has a capacitive input impedance or, more generally, does not permanently take power from the mains. In particular, when digital information are desired to be transmitted, the load is most of the time supplied from a substantially D.C. voltage, generally originating from a rectification, even though this D.C. voltage then is turned back into a discontinuous voltage (for example, by a switched-mode converter). As a result, the load is often associated with a storage means of power that it only cyclically takes from the mains.

More specifically, the present invention provides a method of data transmission over an A.C. power supply line of a load to be cyclically powered, including organizing a switching of the A.C. supply voltage according to a coding of the data to be transmitted and outside cyclic load supply periods, using the A.C. supply voltage as an envelop of pulses having a higher frequency.

According to an embodiment of the present invention, the frequency of the A.C. power supply is relatively low with respect to the relatively high switching frequency for the data transmission.

According to an embodiment of the present invention, the method includes organizing the switching of the A.C. supply voltage, every other halfwave.

According to an embodiment of the present invention, the method includes organizing the switching of the A.C. supply voltage at each halfwave, during the decreasing portion of the halfwave.

The present invention also provides a transmitter of digital data over an A.C. power supply line of a load to be cyclically powered, including a switching means adapted to interrupt the A.C. power supply line according to a coding of the digital data to be transmitted, using the A.C. supply voltage as an envelop of pulses having a higher frequency, the switching means being controlled outside the cyclic load supply periods.

According to an embodiment of the present invention, the transmitter includes a one-way conduction component in parallel with the switching means.

The present invention also provides a receiver of digital data transmitted over an A.C. power supply line of a load to be cyclically powered, the receiver including means for fetching the transmitted digital data from the load supply voltage and the data being formed by a switching, outside the cyclic load supply periods, of the A.C. supply voltage according to a predetermined coding.

According to an embodiment of the present invention, the receiver is associated with a capacitor adapted to providing an approximately D.C. voltage to a load supply circuit, and it includes a one-way conduction means adapted to isolating the capacitor from the means of extraction of the digital data.

The present invention further provides an A.C. load supply signal, including periods of load power supply and periods of transmission of digital data by switching of the signal at a frequency higher than the frequency of the A.C. signal.

According to an embodiment of the present invention, the frequency of the A.C. signal is low with respect to the switching frequency coding the digital data.

The foregoing objects, features and advantages of the present invention, will be discussed in detail in the following non-limiting description of specific embodiments in connection with the accompanying drawings.

DETAILED DESCRIPTION

The same elements have been referred to with the same references in the different drawings. For clarity, only those elements necessary to the understanding of the present invention have been shown in the drawings and will be described hereafter.

Figure 3:
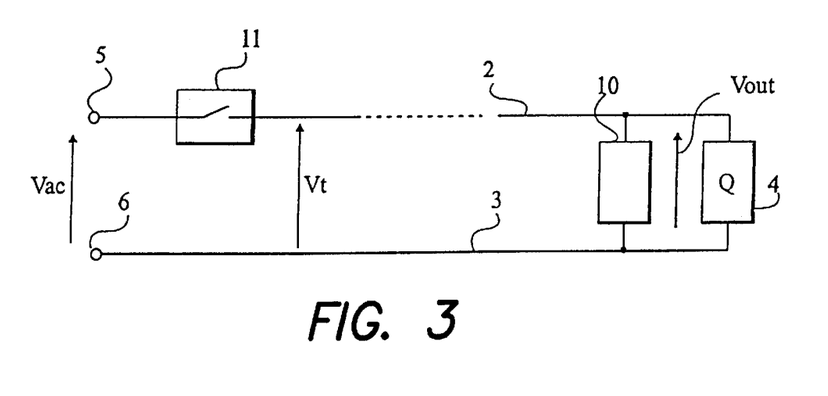
FIG. 3 very schematically shows a system of data transmission over an A.C. power supply line according to the present invention.

FIG. 3 very schematically shows a system of transmission of digital data over an A.C. power supply line of a load (Q) by means of an A.C. voltage Vac of relatively low frequency, for example, the A.C. mains voltage. The system of the present invention includes, on the side of load 4, a receiver unit 10 connected, by two A.C. supply conductors (phase 2 and neutral 3), to a transmitter unit 11 of digital data meant for the receiver. A.C. voltage Vac is applied between two terminals 5, 6 upstream of transmitter unit 11. In the example shown in FIG. 3, transmitter unit 11 is not connected to neutral 3 of the A.C. power supply. However, in most practical cases, transmitter unit 11 includes a connection (not shown in FIG. 3) to the neutral of the A.C. power supply wherefrom it takes its own power supply.

Transmitter unit 11 provides a voltage Vt to be transmitted over the A.C. power supply line. Voltage Vt corresponds to the transmission signal of the present invention, that is, voltage Vt alternates, cyclically, periods of power transmission to load 4 in which voltage Vac is not modified and periods of data transmission in which voltage Vac is switched at a relatively high frequency with respect to the frequency of voltage Vac, to code the digital data.

Functionally and in a simplified manner, transmitter unit 11 behaves like a switch interrupting one of the lines (here, phase 2) of the A.C. power supply at a relatively high frequency to have, during data transmission periods, a succession of high and low levels corresponding to the message to be transmitted.

On the side of load 4, receive unit 10 has several features. First, unit 10 includes means of reception of the data transmitted by switching voltage Vac, and means of processing of these data adapted to the concerned application. Further, the data recovery, on the side of receive unit 10, must not be performed at the cost of the load power supply. In other words, load supply voltage Vout must not be altered by the data transmission. As a result, preferably, load supply voltage Vout corresponds to a voltage obtained by successive and cyclic storages, for example, by means of a capacitor, of the power carried by the A.C. supply line during periods when it does not carry data.

Thus, the present invention preferably applies to a transmission system in which the load has a capacitive impedance and is preferentially supplied from an approximately D.C. voltage obtained by rectifying an A.C. voltage, that is, by using a power storage means (generally a capacitor) to only cyclically take power from the A.C. power supply.

It should however be noted that the present invention can be used in applications to other loads to be supplied. These can be, for example, loads organized (for example, by switching means) to only cyclically take power from the A.C. power supply, even if this load has no capacitive input impedance.

Figure 4:
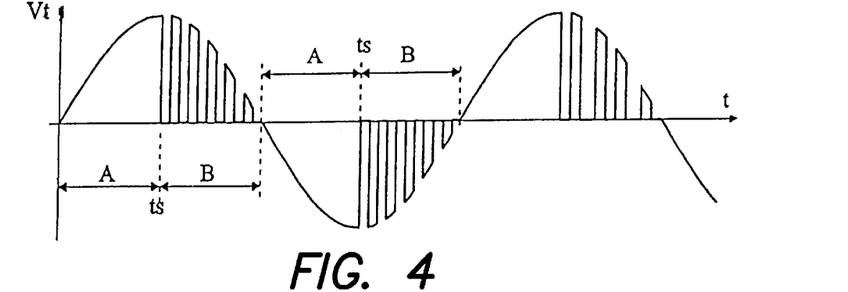
FIG. 4 illustrates, in the form of a timing diagram, a first embodiment of a method of data transmission over an A.C. power supply line according to the present invention.

FIG. 4 illustrates, in the form of a timing diagram, a first embodiment of the present invention in which the digital data transmission is performed, for each halfwave of A.C. voltage Vac, in the decreasing portion of the A.C. voltage. FIG. 4 shows an example of shape of voltage Vt transmitted over A.C. power supply line 2, 3 (FIG. 3) between transmitter unit 11 and receive unit 10. This embodiment applies, more particularly, to the case where the load is powered from an approximately D.C. voltage Vout obtained by rectifying voltage Vt and by storage in a capacitor. The power storage in the load supply capacitor is organized for each halfwave during the increasing portion (A) of the voltage. From the top of the halfwave (time ts), voltage Vt becomes smaller than the power stored in the capacitor and said capacitor is used to supply the load. The decreasing portion (B) of the halfwave is thus free to transmit digital data. To guarantee a proper operation of the transmission system of the present invention, the capacitor and the load just have to be adapted so that the capacitor discharge is slower than the decrease of the A.C. supply voltage, which is practically always the case.

The switching frequency of voltage Vac during data transmission periods depends on many parameters among which are the switching rate of transmitter unit 11, the data to be transmitted (in particular, the data bulk) and the frequency that receive unit 10 can withstand. Preferentially, the switching frequency is higher than at least twice the frequency of voltage Vac. To increase the rate, this frequency is increased while remaining compatible with the reception threshold, as explained later on.

Figure 5:
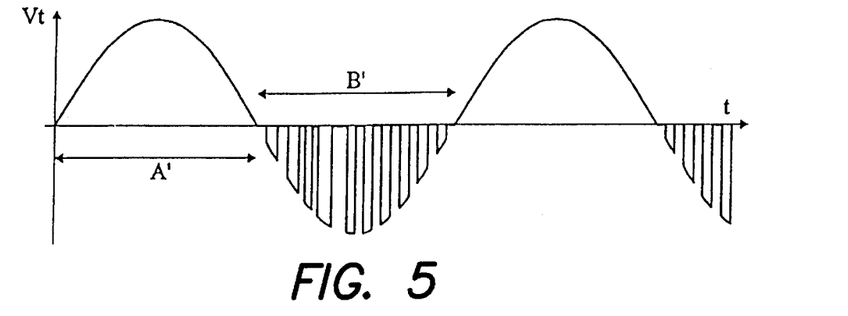
FIG. 5 illustrates, in the form of a timing diagram, a second embodiment of the method of data transmission over an A.C. power supply line according to the present invention.

FIG. 5 illustrates, by a timing diagram showing an example of shape of voltage Vt, a second embodiment of the present invention. According to this second embodiment, one halfwave out of two is used for the transmission of power meant to supply the load and one halfwave out of two is used for the data transmission. This embodiment is more specifically intended for a load associated with a capacitor adapted to storing a sufficient power to only use an additional voltage taken from the A.C. power supply every other halfwave. In the example illustrated in FIG. 5, the positive halfwaves (A') are used to power the load, while the negative halfwaves (B') are used to transmit the digital data according to the present invention.

According to another transmission mode (not shown) where the load has fewer power needs, it may be provided to use several successive halfwaves for the data transmission, and then one or several halfwaves for the power supply. Conversely, for a low data bulk and for a load which cannot stand too frequent interruption of its power supply, the data transmission periods can be spaced apart.

However, the two embodiments illustrated by FIGS. 4 and 5 have the advantage of enabling a simple distinction between supply and transmission periods, as will be seen hereafter.

Whatever the embodiment used, it should be noted that the data are transmitted over the A.C. supply line in the form of a succession of 0 and 1 respectively corresponding to a zero voltage Vt and to a non-zero voltage Vt. Any digital data coding mode compatible with such a transmission may be used in a data transmission according to the present invention. For example, a data frame may be sent according to a transmission protocol of the type known under denomination RS232.

Figure 6:
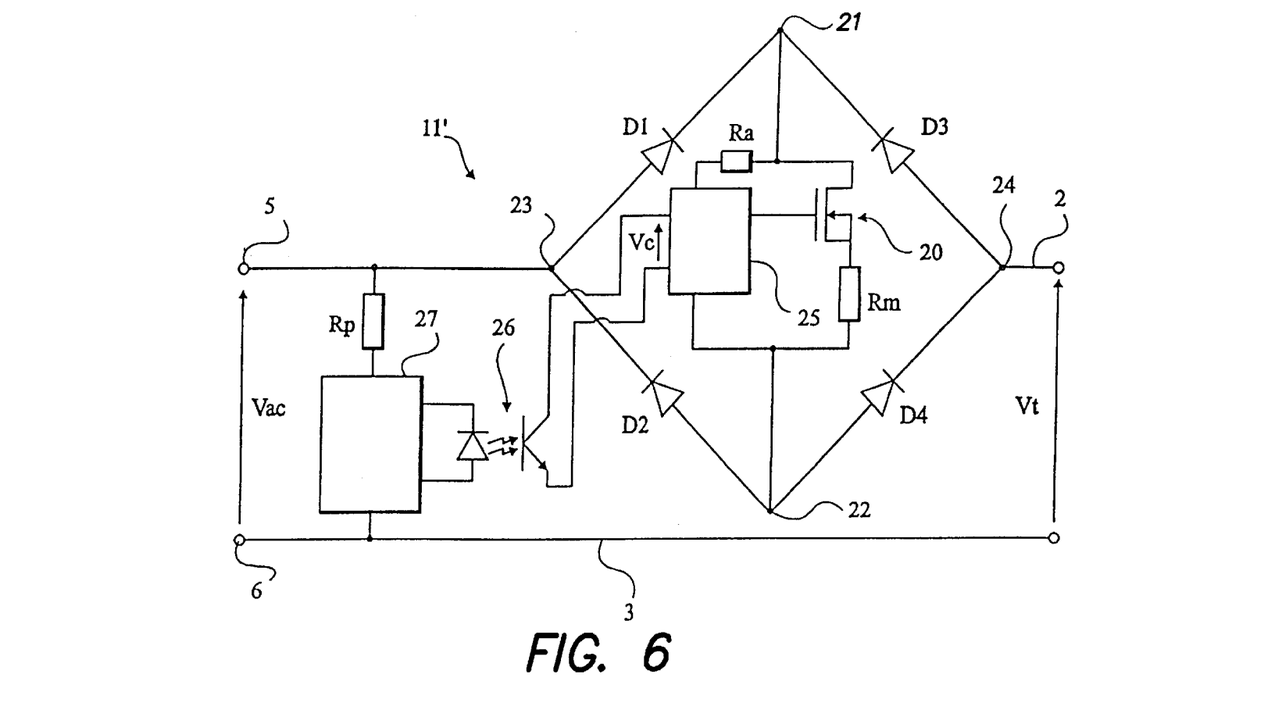
FIG. 6 shows a first embodiment of a transmitter of digital data over an A.C. power supply line according to the present invention.

FIG. 6 shows a first embodiment of a transmitter unit 11', more specifically intended for the first embodiment of the data transmission illustrated in FIG. 4.

According to this first embodiment, a switch 20 (here, a MOS transistor) connected in series with a measurement resistor Rm between two rectified output terminals 21, 22 of a diode bridge including diodes D1, D2, D3 and D4 is used. A first A.C. terminal 23 of the bridge is connected to terminal 5 (for example, the phase) of A.C. supply Vac while a second A.C. terminal 24 of the bridge forms an output terminal providing voltage Vt to be transmitted over an A.C. supply line. The other conductor (neutral 3) of the A.C. power supply here is uninterrupted. Transistor 20 is controlled by a circuit 25 connected between terminal 22 and, via a supply resistor Ra, terminal 21.

Circuit 25 receives a control voltage Vc indicative of the periods when switch 20 is to be closed, respectively, opened. Circuit 25 has the function of adapting the level of voltage Vc to the control of transistor 20. The practical implementation of circuit 25 is within the abilities of those skilled in the art.

According to the present invention, control voltage Vc is issued, preferably via an optocoupler 26 to avoid reference voltage problems, by a digital control circuit 27 meant to code the information to be transmitted in the form of adapted digital messages. Circuit 27 is, preferably, powered (for example, via a resistor Rp) by voltage Vac. Control voltage Vc of circuit 25 corresponds to the collector-emitter voltage of the phototransistor of optocoupler 26. The practical making of a circuit 27 is within the abilities of those skilled in the art according to the application and to the functional indications given hereabove. As an alternative, circuit 27 can be referenced to terminal 22 and draw its power supply from that of circuit 25. In this case, optocoupler 26 is not necessary and the transmitter unit requires no connection to neutral 3 so that only phase 2 is interrupted for the connection of the transmitter unit.

Figure 7:
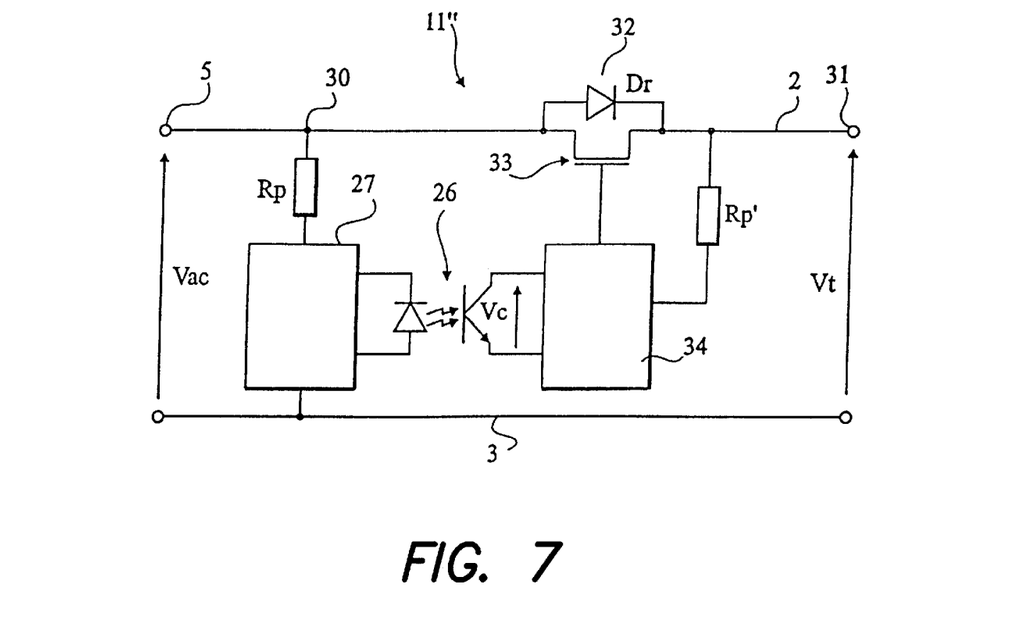
FIG. 7 shows a second embodiment of a transmitter of digital data over an A.C. supply line according to the present invention.

FIG. 7 shows a second embodiment of a transmitter unit 11" according to the present invention. Transmitter unit 111" is more specifically intended for the embodiment illustrated in FIG. 5, that is, the use of the, for example, positive, halfwaves to transmit power to the load and of the, for example, negative, halfwaves, to transmit digital data.

According to this embodiment, transmitter 11" includes, in parallel between two input and output terminals 30 and 31 respectively corresponding to terminal 5 and to the terminal providing voltage Vt, a one-way conduction element 32 (for example, a diode Dr) and a switch 33 (here, a MOS transistor). Transistor 33 is controlled by a block 34, a supply terminal of which is connected, via a resistor Rp', to terminal 31 and an output terminal of which is connected to the gate of transistor 33.

According to the present invention, control block 34 receives a control voltage Vc representative of the respective on and off periods of transistor 33. This voltage is provided, preferably via an optocoupler 26, by a circuit 27 of generation of the digital code similar to that illustrated in relation with FIG. 6.

It should be noted that diode Dr is optional. Indeed, the use of a switch 33 is sufficient if said switch is controlled to be permanently on during positive halfwaves. However, the use of a diode Dr in parallel with switch 33 is a preferred embodiment since the switch does not conduct the load supply current and can thus be sized according to the current exclusively linked to the data transmission. As an alternative, if the switch is formed of a MOS transistor, diode Dr can then be formed by the intrinsic diode of the MOS transistor.

Further, the use of a diode Dr enables, in particular, simplifying the control performed by circuit 27 which can then provide, for each halfwave of voltage Vac, the digital data. These data are however only transmitted every other halfwave by means of diode Dr and this, whatever the control performed on switch 33.

Figure 8:
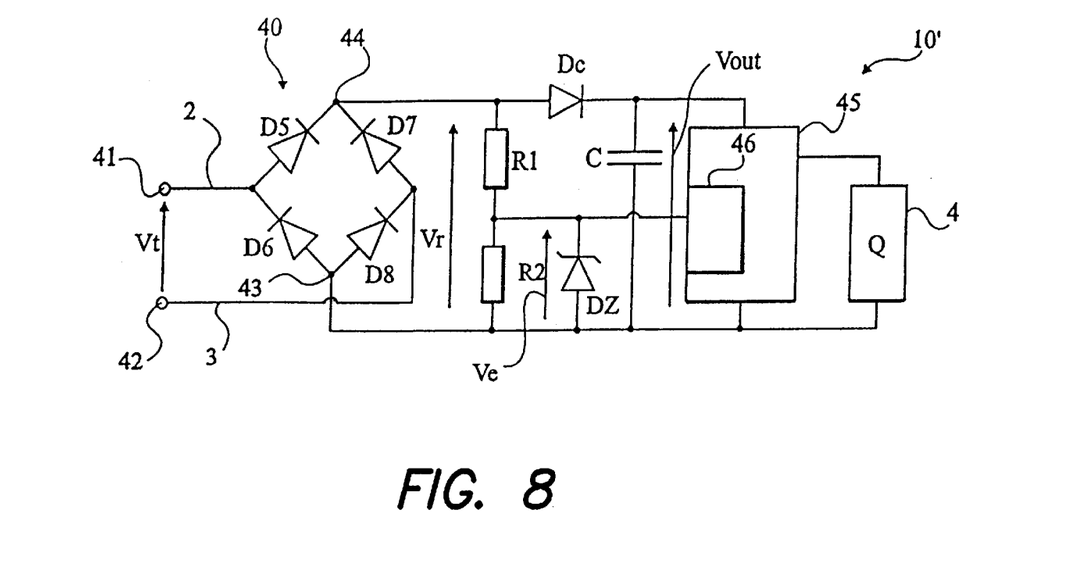
FIG. 8 shows a first embodiment of a receiver of digital data carried by an A.C. power supply line according to the present invention.

FIG. 8 shows a first embodiment of a receive unit 10' according to the present invention. Receive unit 10' corresponds to a supply circuit of a load, the capacitive input impedance of which is defined by a storage capacitor C and more specifically applied to the reception of data transmitted according to the first embodiment (FIG. 4).

This circuit includes a bridge 40 of diodes D5, D6, D7, and D8, two input terminals of which are connected to two terminals 41, 42 of application of A.C. voltage Vt provided by a transmitter unit according to the present invention, for example, such as illustrated in FIG. 6.

A first output terminal 43 of bridge 40 forms a reference potential of circuit 10'. A second output terminal 44 of bridge 40 is devised to provide, with the help of a capacitor C, an approximately D.C. supply voltage Vout to a circuit 45 used to power load 4.

A feature of a receiver adapted to operating with a transmitter of the present invention is that it includes means for maintaining a substantially D.C. voltage Vout across capacitor C, independently from the variations caused by the transmitter, on voltage Vt, during data transmission periods.

In the example shown in FIG. 8, unit 10' includes a diode Dc in series with capacitor C between rectified output terminals 44 and 43 of the bridge, the anode of diode Dc being connected to terminal 44 and the approximately D.C. voltage Vout being taken across capacitor C.

The function of diode Dc, or of a similar one-way conduction element, is to allow rectified A.C. voltage Vr to be sampled before being filtered by capacitor C. This is, according to the present invention, indispensable to extract from A.C. voltage Vt provided by the transmitter the digital data carried by the decreasing half-halfwaves (FIG. 4).

In the embodiment shown in FIG. 8, output voltage Vr of bridge 40, sampled between terminals 44 and 43, is applied at two ends of a voltage dividing bridge formed, for example, of two series-associated resistors R1 and R2. This dividing bridge is meant to limit the current and extract from rectified A.C. voltage Vr and during data transmission periods, a low voltage corresponding to the digital data transmitted in the portion of the halfwave left free by the load supply. Preferably, a zener diode Dz, connected in parallel with resistor R2, clips this low voltage in amplitude and adapts the data to a level compatible with a digital data exploitation block 46 contained, for example, in circuit 45. This could be, for example, a microcontroller, diode Dz having a threshold voltage adapted to the logic levels that this microcontroller can receive.

It should be noted that any other means equivalent to a voltage step-down transformer could be used instead of the resistive dividing bridge. However, the use of resistors is a preferred embodiment due to its simplicity. Similarly, other one-way conduction means may be used instead of diode Dc which however is a preferred embodiment on account of its simplicity.

As an alternative, zener diode Dz or any other similar clipping means is used without a dividing bridge or similar voltage step-down means. The current is however preferably limited, for example, by keeping resistor R1.

Figure 9A:
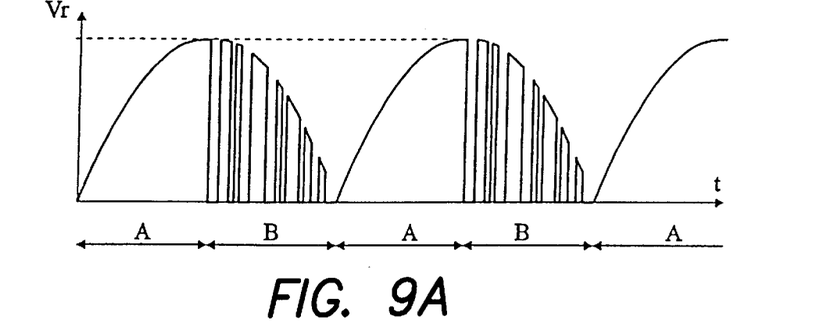
FIGS. 9A to 9C illustrate, in the form of timing diagrams, the operation of the receiver of FIG. 8 implementing the embodiment shown in FIG. 4.
Figure 9B:
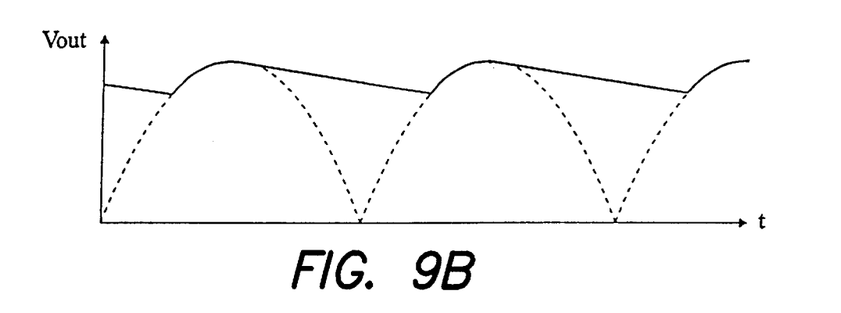
Figure 9C:
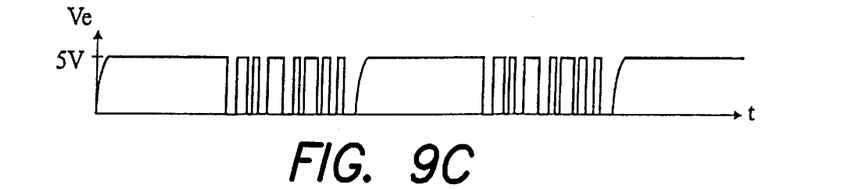

The operation of a receive unit 10' such as shown in FIG. 8 is illustrated by FIGS. 9A to 9C which show, in the form of timing diagrams, an example of shapes of voltages Vr, Vout, and Ve across diode Dz, for a voltage Vt such as illustrated in FIG. 4.

The voltage shape of FIG. 9A corresponds to rectified voltage Vt.

As illustrated in FIG. 9B, due to diode Dc and to the sizing of capacitor C, said capacitor powers load Q and circuit 45 during each decrease of voltage Vr. Thus, voltage Vout is maintained at a substantially continuous level although voltage Vr undergoes variations during the decreasing periods of each halfwave.

Voltage Ve (FIG. 9C), recovered across diode Dz, is at a high level (for example, 5 volts) during all the increasing portions of the halfwave and reproduces, by a succession of high (5 volts) and low (0 volt) levels the switching present on voltage Vr during decreasing portions.

It should be noted that most (in duration) of the decreasing portion (B) of the halfwave can be used to transmit data. Indeed, taking as an example a 220-volt mains voltage at a 50-Hz frequency, said voltage only reaches, by its natural decrease, a level under 5 volts 52 microseconds before its zero crossing. Accordingly, the time window available for the transmission will be, for each halfwave, 5 milliseconds minus 52 microseconds, that is, approximately 4.9 milliseconds every 10 milliseconds. For a 110-volt mains voltage at a 60-Hz frequency, this level is reached 86 microseconds before the zero crossing and the available transmission window is at most on the order of 4 milliseconds.

It should however be noted that, even though attention has to be paid to the voltage level decrease at the end of a halfwave (in particular, due to the possible voltage step-down system) and the frame duration of the transmitted data has to be reduced accordingly, this duration reduction is negligible as compared to the duration available for the data transmission. As indicated above, this can eventually determine the selection of the switching frequency of the voltage Vac.

The detection of the beginning of each digital message on voltage Ve will be performed, for example, by a detection on the receive side of the transiting through a maximum of A.C. voltage Vr or by a specific code transmitted at each transmission frame beginning.

Preferably, on the transmitter side, the digital frames are transmitted from a microcontroller synchronized on voltage Vac, to only transmit during authorized periods.

An advantage of the present invention is that it gets rid of the problem of low impedance of the carrier current system lines. Indeed, by using the periods of the A.C. voltage which are left free by the actual load supply, the data transmission is performed while the supply line exhibits, on the load side, a high impedance (due to the one-way conduction means being blocked).

Another advantage of the present invention is that the transmission of the digital data frame is then performed in a practically non-dissipative way without for all this introducing any problem of line dimming or of reception of low amplitude signals.

Therefore, according to the present invention, it is possible to directly switch the supply voltage although it is generally of a high amplitude (approximately 300 peak volts for a 220-volt mains power supply and approximately 160 peak volts for a 110-volt mains power supply). This considerably simplifies the recovery of the digital data on the receive unit side.

Another advantage of the present invention is that by transmitting the data at high impedance, said data are not dimmed and their recovery requires no filtering and/or amplification system. The receiver thus is particularly simplified.

Figure 10:
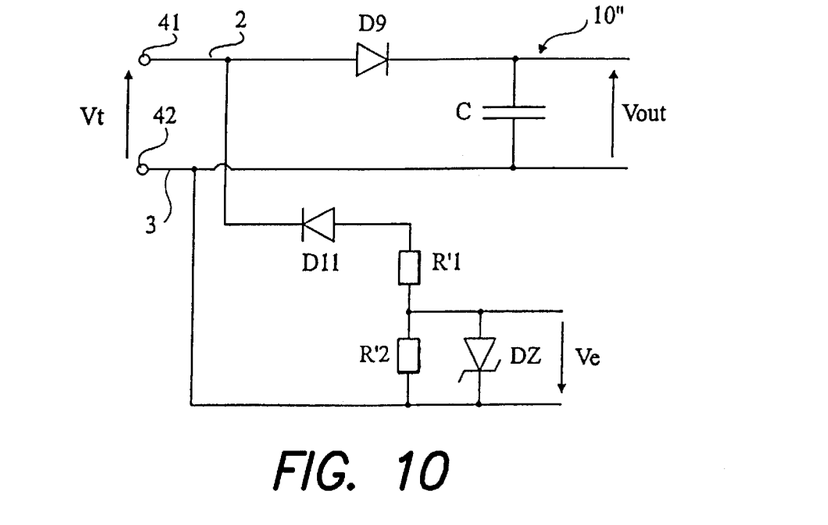
FIG. 10 shows a second embodiment of a receiver of digital data carried by an A.C. power supply line according to the present invention.

FIG. 10 shows a second embodiment of a receiver 10" according to the present invention. This embodiment is more specifically meant for a separation in time of the power transmission and data transmission periods every other halfwave (FIG. 5).

According to this embodiment, a diode D9 and capacitor C are connected in series between terminals 41 and 42 of application of voltage Vt. The anode of diode D9 is connected to terminal 41. It is here assumed that capacitor C is meant to be supplied by the positive halfwaves of the supply voltage.

For clarity, the circuits of exploitation of voltage Vout and the load as well as the circuit of exploitation of the transmitted data Ve have not been shown in FIG. 10.

According to this second embodiment, the digital data frames are sampled upstream of diode D9. The cathode of a diode D11 is connected to terminal 41 and its anode supplies a resistive dividing bridge formed of resistors R'1, R'2 in series, the free end of the resistive bridge being connected to terminal 42. A zener diode Dz is connected in parallel with resistor R'2 and the voltage representative of the digital data Ve is sampled across diode Dz.

This embodiment requires that conductors 2, 3 of transmission of voltage Vt be located between the transmitter and the receiver to perform a connection respecting the polarity of the halfwaves. However, this embodiment has the advantage of performing a recovery by diode D11 only of the data transmitted by negative halfwaves. Accordingly, it is not required to provide, on the digital data receiver side, any means for suppressing or eliminating the voltage level received during positive halfwaves.

The system of digital data transmission over an A.C. power supply line by applying the solution provided by the present invention has many applications.

For example, such a digital data transmission system could be used to control a lighting system provided with several fluorescent light sources while a single line of A.C. power supply from a switch is available. In this case, the digital information is used to select the light source(s) of the system, as well as, if desired, their respective light intensities.

In such a field of application, the present invention has a more specific interest in the modification of existing electric installations since it requires no additional wire passage.

More generally, the present invention can be implemented in any electric installation to carry information over A.C. power supply lines. This can be, for example, electric controls of shutters or other closing systems.

Of course, the present invention is likely to have various alterations, modifications, and improvements which will readily occur to those skilled in the art. In particular, the choice of the embodiment (halfwave portion, one halfwave out of two, several successive halfwaves) for the data transmission periodicity depends on the application and, in particular, on the energetic needs of the load, linked to the possible storage means associated therewith. Further, the A.C. voltage switching frequency is adapted to the digital data transmission mode and to the bulk of data to be transmitted. Moreover, other transmission-reception means than those described as an example may be provided, provided that they respect the described functionalities. On this respect, it should be noted that the sizing of the different components of the transmitters-receivers is within the abilities of those skilled in the art according to the application and based on the indicated functional indications. Especially, it will be ascertained to select a switching means for switching the A.C. supply voltage which is adapted to the clock frequency of the transmitted data. As an example, a clock frequency on the order of 100 kHz may be provided, which is perfectly compatible with existing high voltage switching means. A throughput equivalent to 100 kbits per second is obtained in these conditions.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of transmitting data over an A.C. power supply line of a load having cyclic power supply periods, comprising acts of:
   organizing a switching of an A.C. supply voltage according to a coding of the data to be transmitted outside the cyclic power supply periods of the load; and
   using the A.C. supply voltage as an envelope of pulses having a higher frequency.

2. The method of claim 1, wherein a frequency of the A.C. power supply is relatively low with respect to a relatively high switching frequency for the data to be transmitted.

3. The method of claim 1, wherein the organizing of the switching of the A.C. supply voltage, occurs every other halfwave.

4. The method of claim 1, wherein the organizing the switching of the A.C. supply voltage occurs at each halfwave, during a decreasing portion of the halfwave.

5. A transmitter of digital data over an A.C. power supply line of a load having cyclic power supply periods, including:
   a switching means adapted to interrupt the A.C. power supply line according to a coding of the digital data to be transmitted, that uses the A.C. supply signal as an envelope of pulses having a higher frequency; and
   wherein the switching means is controlled outside the cyclic supply periods of the load.

6. The transmitter of claim 5, including a one-way conduction component in parallel with the switching means.

7. A receiver of digital data transmitted over an A.C. power supply line of a load having cyclic supply periods, the receiver including:
   a means for extracting from a load supply voltage the digital data that was transmitted; and
   wherein the data is formed by a switching, outside the cyclic supply periods of the load, of the A.C. supply voltage according to a predetermined coding.

8. The receiver of claim 7, including:
   an associated capacitor adapted to provide an approximately D.C. voltage to a load supply circuit; and
   a one-way conduction means adapted to isolating the capacitor from the means for extracting the digital data.

9. A transmitter of digital data over an A.C. power supply line of a load having cyclic power supply periods, including:
   a switching circuit to switch an A.C. supply voltage according to a coding of the digital data to be transmitted; and wherein the switching circuit switches the A.C. supply voltage outside the cyclic power supply periods of the load.

10. The transmitter of claim 9, wherein the switching circuit switches the A.C. supply voltage during every other halfwave.

11. The transmitter of claim 9, wherein the switching circuit switches the A.C. supply voltage each halfwave during a decreasing portion of the halfwave.

12. The transmitter of claim 9, wherein the A.C. supply voltage is used as an envelope for pulses having a higher frequency than a frequency of the A.C. supply signal.

13. The transmitter of claim 9, wherein a switching frequency of the A.C. supply voltage during periods of data transmission is higher than at least twice a frequency of the A.C. supply voltage.

14. The transmitter of claim 9, wherein the coding of the digital data to be transmitted is done according to an RS232-type transmission protocol.

15. A system for transmitting digital data over an A.C. power supply line of a load, including:
 a switching circuit that, during a first period of an A.C. supply signal, allows the load to be supplied by the A.C. supply signal, and during a second period of the A.C. supply signal, switches the signal according to a coding of the digital data to be transmitted; and
 a first element that supplies a D.C. voltage to the load during the second period of the supply signal.

16. The system of claim 15, wherein the first and second periods of the A.C. supply signal are alternate halfwaves of the A.C. supply signal.

17. The system of claim 15, wherein the first period of the A.C. supply signal corresponds to an increasing portion of a halfwave of the A.C. signal, and wherein the second period of the A.C. supply signal corresponds to a decreasing portion of a halfwave of the A.C signal.

18. The system of claim 15, wherein the first element that supplies a D.C. voltage to the load is a capacitor.

19. The system of claim 15, wherein the A.C. supply signal is used as an envelope signal for the digital data.

20. The system of claim 15, wherein a switching frequency of the A.C. supply signal is higher than at least twice a frequency of the A.C. signal.

21. The system of claim 15, wherein the coding of the digital data is done according to an RS232-type transmission protocol.

22. A receiver of digital data transmitted over an A.C. power supply line of a load having cyclic power supply periods, including:
 a circuit that extracts the digital data that was transmitted from a load supply voltage; and
 wherein the digital is formed by a switching of an A.C. supply voltage outside the cyclic power supply periods during which the A.C. supply voltage supplies the load.

23. The receiver of claim 22, further including:
 a capacitor that provides a substantially D.C supply voltage to the load during periods when the A.C. supply voltage does not supply the load and is being switched to transmit the digital data; and
 a one-way conduction element that isolates the capacitor from the circuit that extracts the digital data.

\* \* \* \* \*